US009522546B2

(12) United States Patent
Celante et al.

(10) Patent No.: US 9,522,546 B2
(45) Date of Patent: Dec. 20, 2016

(54) APPARATUS AND METHOD FOR MAKING BUSINESS CARDS

(71) Applicant: ROTAS ITALIA SRL, Treviso (IT)

(72) Inventors: Francesco Celante, Treviso (IT); Enrico Mason, Mogliano Veneto (IT); Davide Torresin, Colfosco (IT)

(73) Assignee: ROTAS ITALIA SRL, Treviso (IT)

( * ) Notice: Subject to any disclaimer, the term of this patent is extended or adjusted under 35 U.S.C. 154(b) by 0 days.

(21) Appl. No.: 14/889,734

(22) PCT Filed: May 9, 2014

(86) PCT No.: PCT/IB2014/061339
§ 371 (c)(1),
(2) Date: Nov. 6, 2015

(87) PCT Pub. No.: WO2014/181310
PCT Pub. Date: Nov. 13, 2014

(65) Prior Publication Data
US 2016/0121623 A1   May 5, 2016

(30) Foreign Application Priority Data
May 9, 2013  (IT) .............................. UD2013A0063

(51) Int. Cl.
B41J 13/00 (2006.01)
G06K 17/00 (2006.01)
(Continued)

(52) U.S. Cl.
CPC ............... *B41J 3/407* (2013.01); *B31D 1/027* (2013.01); *B31D 1/028* (2013.01); *B32B 37/18* (2013.01);
(Continued)

(58) Field of Classification Search
CPC ......... B41J 13/0063; B41J 13/12; B41J 11/20; B41J 2202/35; B41J 3/50; G06K 1/12; G06K 7/01237; G06K 7/10445; G06K 19/022; G06K 19/025; G06K 19/0723; B65C 2210/0097
See application file for complete search history.

(56) References Cited

U.S. PATENT DOCUMENTS

2006/0267776 A1   11/2006 Taki et al.
2007/0159353 A1   7/2007 Arai et al.
(Continued)

FOREIGN PATENT DOCUMENTS

JP   2011008202   1/2011

OTHER PUBLICATIONS

International Search Report and Written Opinion issued in the corresponding PCT application No. PCT/IB2014/061339, dated Sep. 2, 2014, 7 pages.

*Primary Examiner* — Julian Huffman
*Assistant Examiner* — Sharon A Polk
(74) *Attorney, Agent, or Firm* — Hamre, Schumann, Mueller & Larson, P.C.

(57) ABSTRACT

Apparatus to make business cards comprising a supply operating unit to supply a plurality of pairs of sheets and a printing unit configured to print distinctive signs on at least one printable surface of the sheets. The apparatus comprises a coupling unit configured to reciprocally couple, with their coupling surfaces opposite the printable surfaces, the sheets of the pair, an electronic device conformed as a sheet being associated to one of the coupling surfaces; and an electronic writing unit configured to introduce encoded information readable by a reader into the electronic device.

12 Claims, 2 Drawing Sheets

(51) Int. Cl.
  *B41J 3/407*   (2006.01)
  *B31D 1/02*    (2006.01)
  *B32B 37/18*   (2006.01)
  *G06K 19/077*  (2006.01)
  *B32B 37/12*   (2006.01)
  *B32B 38/00*   (2006.01)
  *B41J 13/12*   (2006.01)

(52) U.S. Cl.
  CPC ........ B41J 13/0063 (2013.01); G06K 17/0025 (2013.01); G06K 19/07718 (2013.01); *B32B 37/12* (2013.01); *B32B 38/145* (2013.01); *B32B 2305/342* (2013.01); *B32B 2425/00* (2013.01); *B41J 13/12* (2013.01)

(56) References Cited

U.S. PATENT DOCUMENTS

| | | | |
|---|---|---|---|
| 2013/0134227 A1* | 5/2013 | De Maquille | G06K 19/07722 235/492 |
| 2013/0141222 A1* | 6/2013 | Garcia | G06K 7/01 340/10.51 |
| 2013/0206842 A1* | 8/2013 | Raz | G06K 19/02 235/488 |

* cited by examiner

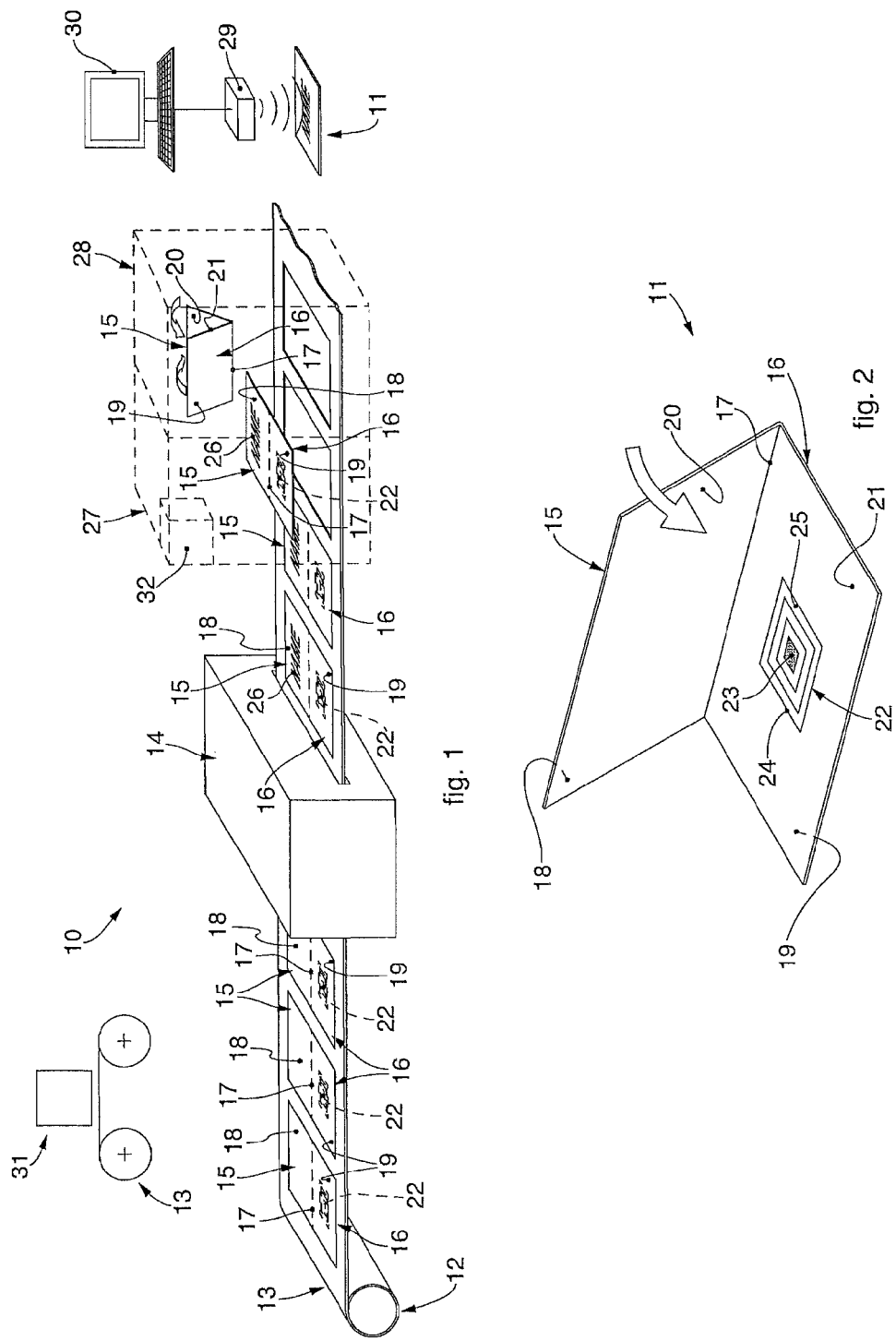

APPARATUS AND METHOD FOR MAKING BUSINESS CARDS

FIELD OF THE INVENTION

The present invention concerns an apparatus for making business cards which, merely by way of example, show information relating to a person, a company, an enterprise, such as the first name, surname, business name, professional or aristocratic titles, address, telephone number or in general useful information for contacting a person or juridical entity.

The present invention also concerns a method for making business cards.

BACKGROUND OF THE INVENTION

Business cards, often used for reasons of work, have the function of exchanging information between people. The information contained on business cards can contain contact data, business name, company logo, firm logo, the name and/or position of the holder of the card, as well as a more or less complete series of personal data, address, telephone number, email addresses, photograph or similar information.

Business cards comprise a support made for example of paper, cardboard, polymer material or combinations thereof such as for example plasticized cardboard, on which the above information is carried.

Merely by way of example, the most widely used format of the support is 85 mm×55 mm, although bigger formats are not excluded, for example postcard format, or smaller formats.

Business cards are also known that carry information both on the front and on the back of the support. In this field business cards are also known that consist of two sheets on each of which information relating to the owner of the business card is printed. The two sheets are then coupled together, using their unprinted surfaces, with the application of adhesive substances such as glues. This method is particularly complex and difficult to achieve, so that it is economical only for making large quantities of business cards.

The information on the support can be reported using substantially known printing processes such as ink jet printing, screen printing, laser printing, relief printing or suchlike.

Business cards are also known on which codes readable by readers are carried, using a printing process. The codes on the business card do not allow a direct display of the information contained in them, and the latter is therefore accessible only using a reader.

Merely by way of example, bar codes, QR codes, Data Matrix, Maxicode, Vericode or any other code that comes within this type of codes can be carried on the support.

By reading the code it is possible to decode the information contained inside it, by means of an electronic device associated to the reader. To this purpose the producers of such business cards have perfected their own electronic devices, or applications that can be executed by a computer, that allow to display the information and possibly to save it in their archives.

Since the codes are obtained by printing on the support of the business card, due to a possible deterioration or degeneration of the latter, the codes may not be decodable, thus neutralizing the function of the business card itself.

Furthermore, the codes thus obtained may contain too little information, and in some cases may not be sufficient for their use.

An apparatus is also known for making labels for clothes or articles in general, described in document JP-A-2011.008202, which comprises an operating unit that supplies at least one substrate on which a plurality of pairs of sheets are attached. The apparatus also comprises a printing unit for printing distinctive signs on at least one surface of the sheets. After printing, each pair of sheets is detached and the sheets of each pair are folded back on themselves around a line of intended folding so as to define the label.

This form of embodiment does not provide a reciprocal coupling of the sheets of each pair, and therefore the label is not suitable for an application as a business card. Furthermore, like the forms of embodiment described above, it has disadvantages such as limited printing space for information and possible deterioration over time.

In the field of business cards, cards that integrate RFID (Radio Frequency Identification) devices are also known, which are able to contain a large amount of information concerning the owner of the card.

The apparatuses used for making business cards that integrate RFID devices are particularly complex and require the production of high print runs of business cards both for technical reasons, since large format sheets are printed, or more recently large size rolls containing hundreds/thousands of cards, and also for economic reasons since it is not possible to manage personalizations that require a limited production volume. In this way the degree of personalization that may be required by each owner of the business card is lost.

Furthermore, the apparatuses used, precisely because of their complexity, are particularly costly, bulky and difficult to manage by non-specialized operators.

To overcome these disadvantages, it is also known to make the business cards manually, by applying RFID labels on a surface, external in use, of already printed business cards. This form of embodiment does not allow to print the front and back of the cards and is particularly complex to make, as well as having an unaesthetic presentation of the false label.

One purpose of the present invention is to perfect an apparatus for making business cards that allows to obtain business cards that are reliable and efficient over time, personalizable also by the final user and also directly in the final printing step, even when only a few copies are made.

Another purpose of the present invention is to obtain an apparatus for making business cards that allows to obtain business cards containing a large amount of information.

Another purpose of the present invention is to obtain an apparatus for making business cards that is simple and economical, and that can be used to make a multitude of business cards, and that can also allow the producer to supply semi-worked pieces that can be completed and personalized also individually in the final printing step.

Another purpose of the present invention is to perfect a method for making business cards that allows to carry an unlimited amount of information on the possible support of the cards.

Another purpose of the present invention is to perfect a method for making business cards that allows to preserve over time the information contained thereon even after the corresponding support has deteriorated.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, an apparatus for making business cards comprises an operating unit for supplying a plurality of pairs of sheets and a printing unit configured to print distinctive signs on at least one printable surface of at least one of said sheets for each pair.

In one solution of the invention, the pairs of sheets are associated with a support substrate.

According to one form of the present invention, printing can be carried out, in a first solution, with the support substrate in movement, if present, and the printing unit stationary, or vice versa.

According to a variant, printing is carried out with the support substrate and the printing unit stationary.

According to another variant, both the printing unit and the support substrate can be in movement during printing.

According to one feature of the present invention, the apparatus comprises:
- an application operating unit to apply an electronic device conformed as a sheet on a coupling surface of one of the sheets, the coupling surface being opposite to a corresponding one of the printable surfaces;
- a coupling unit configured to reciprocally couple the sheets of one pair, with their respective coupling surfaces, and
- an electronic writing unit configured to introduce electronically encoded information readable by a reader into the electronic device.

With the present invention it is possible to obtain business cards directly, starting from sheets, possibly adhesive or made adhesive, and integrating an electronic device that allows the sheets to be personalized by a user.

The apparatus is simple to make and not bulky, to such an extent that it can be adopted even by small retail outlets of business cards, which can possibly perform at least one of the printing or writing operations on one of the two adhesive sheets, before or after it is coupled with the other.

The business card obtained with the apparatus described above can contain a large amount of information thanks to the electronic device integrated therein, and can carry on its surfaces general data of the person to which it refers. The electronic device, conformed as a sheet, is in fact equipped with a memory to contain encoded information at least relating to the owner of the business card.

According to a possible embodiment of the invention, the supply operating unit is configured to supply to the printing unit the at least one support substrate to which the sheets are associated. The support substrate can be, for example, in the form of a roll or strip.

According to a possible alternative solution, the supply operating unit supplies to the printing unit disposed downstream the sheets already in a separated condition. It may be provided, for example, that the supply operating unit comprises one or more loaders containing said sheets.

According to a possible form of embodiment of the present invention, and in the event that the sheets are coupled with a support substrate, the apparatus can also comprise a separation unit, configured to separate, after at least one of the sheets of the pair has been printed, from the at least one support substrate, at least one pair of sheets on at least one of which the distinctive signs are printed.

According to a possible form of embodiment, the support substrate can comprise sheets, respectively a first sheet and a second sheet, the coupling surfaces of which are adhesive.

The presence of a first sheet and a second sheet having adhesive coupling surfaces, whether they are sheets that form the label or the sheets of the support substrate, allows to simplify the steps of making the business card, since supplementary operations of applying adhesive substances on the sheets that define the card are no longer required.

With the present invention it is also possible to obtain a business card with a conformation and appearance similar to the business cards currently used but which, thanks to the presence of the electronic device, can contain a large quantity of information relating to the owner, which information is accessible for the possessor by means of substantially known readers. Furthermore, by reading with the reader it is possible to directly save the data relating to the person, for example on a processor or telecommunication device, without requiring the data to be introduced manually.

The electronic device also guarantees the information remains permanently inside it, even if the business card deteriorates.

The apparatus for making business cards described here can be made completely in a single body and in a compact form to contain all said apparatuses and allow it to be installed directly in shops or retail outlets.

Other forms of embodiment can provide that the writing unit that writes the data on the electronic device is a separate element from the other units of the apparatus. In this case, in fact, it may be provided to make the business card in a first production site, for example the site where the business card is sold and/or distributed, and the data are written in the electronic device in another site, for example by means of readers/writers belonging to the owner of the business card himself. In this way the owner of the business card can modify the data written in the electronic device, for example following a change in his position, address or suchlike.

The present invention also concerns the method for making business cards that comprises the supply of a plurality of pairs of sheets and the printing of distinctive signs on at least one printable surface of at least one sheet for each pair.

According to one feature of the present invention, the method comprises:
- a step of applying an electronic device conformed as a sheet on at least one coupling surface of at least one of the sheets of the pair, the coupling surface being opposite to a corresponding one of the printable surfaces;
- the coupling, with their coupling surfaces, of sheets of a pair, and
- the electronic introduction into the electronic device of information readable by a reader.

BRIEF DESCRIPTION OF THE DRAWINGS

These and other characteristics of the present invention will become apparent from the following description of some forms of embodiment, given as a non-restrictive example with reference to the attached drawings wherein:

FIG. 1 is a schematic representation of an apparatus for making business cards according to the present invention;

FIG. 2 is an exploded view of a business card according to the present invention;

Figure 3:
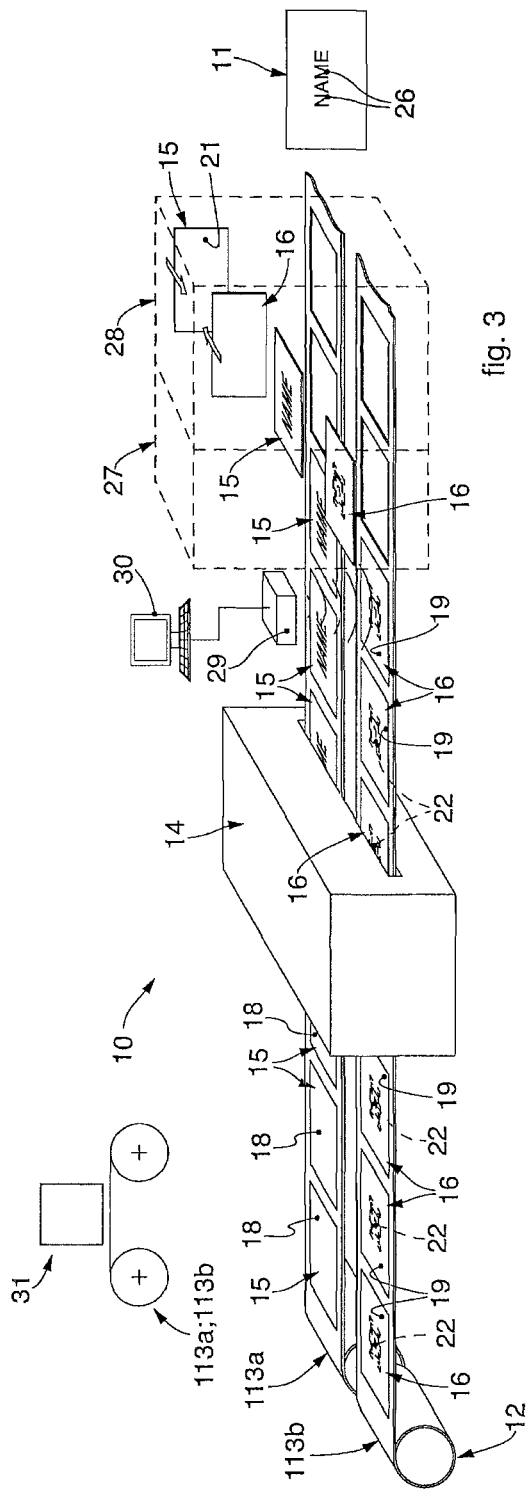
FIG. 3 is a schematic representation of an apparatus according to a variant of FIG. 1.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME FORMS OF EMBODIMENT

With reference to FIG. 1, an apparatus 10 according to the present invention is configured to make business cards 11.

The apparatus 10 comprises at least a supply operating unit 12 to supply a plurality of pairs of sheets, in this case a first sheet 15 and a second sheet 16 for each pair.

According to one possible form of embodiment, the first sheet 15 and second sheet 16 can be separated from each other or they can be associated with at least one support substrate 13, 113a, 113b.

The supply operating unit 12 is configured to supply the first sheet 15 and second sheet 16, possibly associated to the support substrate 13, 113a, 113b, to a printing unit 14 disposed downstream.

In the form of embodiment shown in FIG. 1, the supply operating unit 12 is suitable to support and supply a single support substrate 13, whereas in the form of embodiment shown in FIG. 3 it is provided to supply two support substrates, respectively 113a and 113b.

The support substrate 13, 113a, 113b can be in the form of a strip wound in a roll, or in the form of a planar segment.

The support substrate 13, 113a, 113b is in the form of a self-adhesive label from which a first sheet 15 and a second sheet 16 can be removed, each having an adhesive surface.

The first sheet 15 and second sheet 16 can be already cut in the desired shape and size with respect to the support substrate 13, 113a, 113b to which they are associated.

Some forms of embodiment, not shown in the drawings, can provide that the apparatus 10 comprises cutting devices configured to cut a first sheet 15 and a second sheet 16 from the support substrate 13, 113a, 113b.

Figure 4:
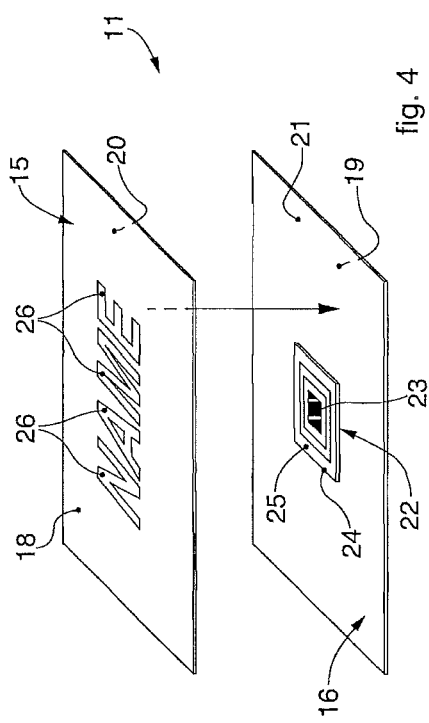
FIG. 4 is an exploded view of a business card obtained with the apparatus in FIG. 3.

In the form of embodiment in FIGS. 1 and 2, the first sheet 15 and second sheet 16 are reciprocally connected and made in a single body along a common connection side 17. Other forms of embodiment (FIGS. 3 and 4) may provide that the first sheet 15 and second sheet 16 are distanced and separate from each other.

In the form of embodiment shown in FIG. 3, instead, the first sheet 15 is removable from the support substrate 113a, whereas the second sheet 16 is removable from the support substrate 113b.

The first sheet 15 and second sheet 16 each have a printable surface 18 and respectively 19, facing toward the outside during use, and an adhesive coupling surface 20 and respectively 21, which is coupled with the support substrate 13, 113a, 113b.

It is not excluded that, in other forms of embodiment, the coupling surfaces 20 are not adhesive but are made adhesive during the coupling steps of the sheets 15 and 16, as described hereafter.

The first sheet 15 and second sheet 16 can have substantially the same plan shape and sizes, in this case both have a rectangular shape or other compatible shapes.

The first sheet 15 and second sheet 16 can be made of paper, cardboard, polymer materials or possible combinations thereof.

At least one of the printable surfaces 18, 19 can be protected by transparent films and/or possibly can be enhanced, giving effects of transparency, metalization or suchlike.

An adhesive substance is distributed on the coupling surfaces 20, 21, which allows both to keep the first sheet 15 and second sheet 16 temporarily attached to the support substrate 13, 113a, 113b, and also subsequently to couple the latter to each other.

The adhesive substance can comprise glues, such as vinyl, silicon, epoxy, uric or polyurethane glues, hot-applied glues or suchlike, or adhesives such as acrylic or solvent adhesives, adhesives with a rubber base, with a silicon film or suchlike.

An electronic device 22 is associated to the coupling surface 21 of the second sheet 16, configured to memorize information relating to the person to whom the business card 11 refers.

According to one possible form of embodiment, the apparatus comprises an application operating unit 31 to apply the electronic device 22 conformed as a sheet on the coupling surface 20, 21 of one of the sheets 15, 16 for each pair.

The application operating unit 31 can be integrated with the supply operating unit 12 and the printing unit 14, or it can be a separate component configured to generate the support substrate 13, 113a, 113b, for example in the form of a roll or coil, or one of the sheets 15 or 16 with the electronic device 22 coupled therewith. The support substrate 13, 113a, 113b and the sheets 15, 16 can thus be fed to the supply operating unit 12 to be subsequently supplied to the operating units located downstream.

The electronic device 22 has a sheet type configuration and can comprise a tag or transponder suitable to memorize data and, if interrogated by suitable fixed or portable apparatuses, also called readers, to communicate to the reader the information contained therein.

Some forms of embodiment of the present invention provide that the tag is the passive type, to reduce its sizes. It can also be active when the feed technology allows it, thus reducing the bulk.

Some forms of embodiment provide that the electronic device 22 is based on the communication technology known as RFID, or Radio Frequency Identification.

In the form of embodiment shown in FIG. 2, the electronic device 22 comprises at least a miniaturized electronic circuit, or microchip 23, which contains the information in a memory, an antenna 24 to transmit the information from the microchip 23 to the reader, and possibly a substrate 25 on which the microchip 23 and the antenna 24 are located.

The substrate 25 can be made of paper, polymer material such as PET, PVC, Mylar or suchlike.

The substrate 25 can be provided, on at least one of its surfaces, with adhesives to allow it to be applied on the coupling surface 21 of the second sheet 16, or to simplify the coupling of the first sheet 15 with the second sheet 16 in the coupling step between the coupling surfaces 20 and 21, or again to allow the temporary adhesion of the first sheet 15 and second sheet 16 to the support substrate 13, 113a or 113b.

The printing unit 14 is configured to print, on at least one of the printable surfaces 18, 19 of the first sheet 15 and/or second sheet 16, distinctive signs 26 carrying information relating to the owner of the business card 11, such as writings, logos, photographs, drawings or suchlike.

The printing unit 14 can comprise ink jet printers, laser printers, screen printers, heat transfer printers or direct heat printers.

Other forms of embodiment may provide that the printing unit 14 comprises printing apparatuses in letterpress mode or intaglio mode.

In one form of embodiment shown here, the apparatus 10 also comprises a separation unit 27 to separate the first sheet 15 and the second sheet 16 from the support substrate 13, 113a, 113b.

The separation unit 27 can comprise separation members such as spatulas, blades, scrapers, jets of compressed air or combinations thereof, provided to act on the support substrate 13, 113a, 113b and to separate from the latter the first sheet 15 and second sheet 16.

The apparatus 10 also comprises a coupling unit 28 configured to couple the first sheet 15 and the second sheet 16 with the respective coupling surfaces 20, 21 so as to dispose the electronic device 22 between them. The adhesive substance present on the latter defines the reciprocal coupling.

If the first sheet 15 and the second sheet 16 are not adhesive, it may be provided that the coupling unit 28 comprises an adhesive device 32, shown only schematically in FIG. 1, configured to render at least one of the coupling surfaces 20, 21 adhesive. The adhesive device 32 may comprise, merely by way of example, members for spreading a glue or members for activating an adhesive substance.

With reference to FIG. 1, once the first sheet 15 and the second sheet 16 have been separated from the support substrate 13, the coupling unit 28 is configured to fold the latter along their common connection side 17 so as to couple the respective coupling surfaces 20, 21.

To this purpose, the coupling unit 28 can possibly be associated with creasing or cutting devices to achieve lines of intended folding along the connection side 17 and/or folding devices.

In the form of embodiment shown in FIG. 3, the first sheet 15 and the second sheet 16 are removed respectively from the support substrate 113a and the support substrate 113b by the separation unit 27, and subsequently coupled with their coupling surfaces 20, 21 with the coupling unit 28.

Other forms of embodiment may provide that the coupling unit 28 comprises presser devices, for example presser rolls or plates, pressed one against the other, tapes, belts or possible combinations thereof, between which the first sheet 15 and the second sheet 16 are disposed.

The apparatus 10 according to the present invention also comprises an electronic writing unit 29, possibly commanded and/or controlled by a processor 30 and configured to carry in the electronic device 22 the information relating to the owner of the business card 11, or other information that the latter wishes to make known to the person to which the business card 11 is given.

In the form of embodiment shown in FIG. 1, the electronic writing unit 29 is located downstream of the coupling unit 28, although a different position thereof is not excluded, for example upstream of the coupling unit 28 (FIG. 3) or of the printing unit 14.

It is clear that modifications and/or additions of parts may be made to the apparatus 10 and method, and also the business cards 11 thus obtained as described heretofore, without departing from the field and scope of the present invention.

For example, some forms of embodiment of the present invention may provide that at least the supply operating unit 12, the printing unit 14, the separation unit 27 and the coupling unit 28 are reciprocally connected and contained in a single containing body. This solution allows to obtain an extremely compact apparatus 10, that can be adopted even by small sellers of business cards 11, such as tobacconists or stationers', small print shops, or possibly associated with automatic machines for distributing business cards, or usable directly in the office.

Other forms of embodiment again can provide that, instead of being directly associated with one of the sheets 15, 16, the electronic device 22 is applied directly by the apparatus 10 according to the present invention. In this case, the apparatus 10 also comprises an application operating unit of the electronic device 22 that provides to apply the latter on one of the coupling surfaces 20 or 21 of the sheets 15, 16. The application operating unit of the electronic device 22 can be interposed, for example, between the separation unit 27 and the coupling unit 28.

It is also clear that, although the present invention has been described with reference to some specific examples, a person of skill in the art shall certainly be able to achieve many other equivalent forms of apparatus 10, method and business cards 11, having the characteristics as set forth in the claims and hence all coming within the field of protection defined thereby.

The invention claimed is:

1. An apparatus for making business cards comprising a supply operating unit to supply a plurality of pairs of sheets and a printing unit configured to print distinctive signs on at least one printable surface of at least one of said sheets for each pair, wherein said apparatus further comprises:
    an application operating unit to apply an electronic device conformed as a sheet on a coupling surface of one of said sheets, said coupling surface being opposite to a corresponding one of said printable surfaces;
    a coupling unit configured to reciprocally couple said sheets of each of said pairs with their coupling surfaces; and
    an electronic writing unit configured to electronically introduce encoded information readable by a reader into said electronic device;
    wherein said supply operating unit is configured to supply to said printing unit at least one support substrate, said sheets being associated with said at least one support substrate; and
    wherein said apparatus also comprises a separation unit, disposed downstream of the printing unit, configured to separate at least one of said pairs of sheets from said at least one support substrate.

2. The apparatus as in claim 1, wherein said separation unit is configured to separate said sheets of a pair from said at least one support substrate and to separate said sheets of a pair from each other.

3. The apparatus as in claim 1, wherein said supply operating unit is configured to supply two support substrates respectively supporting a first of said sheets and a second of said sheets of said pair of sheets.

4. The apparatus as in claim 1, wherein said sheets of a pair are reciprocally connected and made in a single body along a common connection side, wherein said coupling unit is configured to fold said sheets along said connection side and to couple them with their coupling surfaces.

5. The apparatus as in claim 4, wherein said coupling unit is associated to creasing or cutting devices, to make lines of intended folding along said connection side.

6. The apparatus as in claim 1, wherein at least said printing unit and said coupling unit are reciprocally connected with respect to each other and contained in a single containing body.

7. The apparatus as in claim 1, wherein said coupling unit comprises an adhesive device configured to render at least one of said coupling surfaces adhesive.

8. A method to make business cards comprising the supply of a plurality of pairs of sheets and the printing of distinctive signs on at least one printable surface of at least one of said sheets for each pair wherein said method comprises:

applying an electronic device conformed as a sheet on at least one coupling surface of at least one of said sheets, said coupling surface being opposite to a corresponding one of said printable surfaces;

coupling, with the coupling surfaces, said sheets of each of said pairs; and introducing into said electronic device electronic information readable by a reader;

wherein, during said supply, at least one support substrate on which said sheets are associated is supplied to a printing unit; and wherein the method further comprises the separation of said sheets from the at least one support substrate.

9. The method as in claim 8, wherein said sheets of each pair are supplied, connected and made in a single body along a common connection side.

10. The method as in claim 9, wherein said sheets of a pair are separated from each other by a separation unit located downstream of said printing unit.

11. The method as in claim 9, wherein during said coupling it is provided to fold said sheets of a pair along said connection side.

12. The method as in claim 8, wherein said sheets of each pair are supplied separate from each other.

\* \* \* \* \*